(12) United States Patent
Zhang et al.

(10) Patent No.: US 6,298,145 B1
(45) Date of Patent: Oct. 2, 2001

(54) EXTRACTING IMAGE FRAMES SUITABLE FOR PRINTING AND VISUAL PRESENTATION FROM THE COMPRESSED IMAGE DATA

(75) Inventors: Hong Jiang Zhang, Mountain View, CA (US); Xavier Marichal, Court-Saint-Etienne (BE)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/233,500

(22) Filed: Jan. 19, 1999

(51) Int. Cl.[7] ....................................... G06K 9/00
(52) U.S. Cl. .............................. 382/103; 348/169
(58) Field of Search ................................ 382/103, 166; 345/441; 354/430; 396/55

(56) References Cited

U.S. PATENT DOCUMENTS

| | | | |
|---|---|---|---|
| 4,673,276 | * 6/1987 | Yoshida et al. | 354/430 |
| 5,212,742 | * 5/1993 | Normile et al. | 382/56 |
| 5,655,158 | * 8/1997 | Kai | 396/55 |
| 5,844,573 | * 12/1998 | Pogtgio et al. | 345/441 |
| 5,852,750 | * 12/1998 | Kai et al. | 396/55 |

* cited by examiner

Primary Examiner—Joseph Mancuso
Assistant Examiner—A Tabatabai
(74) Attorney, Agent, or Firm—Thomas X. Li

(57) ABSTRACT

An image processing system for automatically extracting image frames suitable for printing and/or visual presentation from a compressed image data is described. The image processing system includes a face detector that detects if an image frame contains at least a face. The image processing system also includes a blur detector that determines the blur indicator value of the image frame directly using the information contained in the compressed image data if the image frame is determined to contain a face. The blur detector indicates that the image frame is suitable for printing and/or visual presentation if the blur indicator value of the image frame is less than a predetermined threshold. The image processing system may also include a motion analyzer that determines if the image frame is a super-resolution image frame suitable for printing and/or visual presentation if the image frame does not contain any face. The image processing system may also include a face tracker that detects if the image frame contains a non-frontal face.

12 Claims, 12 Drawing Sheets

200

| 1 | 2 | 3 | 4 | 5 | 6 | 7 | 8 |
|---|---|---|---|---|---|---|---|
| 2 | 3 | 4 | 5 | 6 | 7 | 8 | 7 |
| 3 | 4 | 5 | 6 | 7 | 8 | 7 | 6 |
| 4 | 5 | 6 | 7 | 8 | 7 | 6 | 5 |
| 5 | 6 | 7 | 8 | 7 | 6 | 5 | 4 |
| 6 | 7 | 8 | 7 | 6 | 5 | 4 | 3 |
| 7 | 8 | 7 | 6 | 5 | 4 | 3 | 2 |
| 8 | 7 | 6 | 5 | 4 | 3 | 2 | 1 |

FIGURE 10

EXTRACTING IMAGE FRAMES SUITABLE FOR PRINTING AND VISUAL PRESENTATION FROM THE COMPRESSED IMAGE DATA

BACKGROUND OF THE INVENTION

1. Field of the Invention

The present invention pertains to digital image processing. More particularly, this invention relates to apparatus and a method for extracting image frames suitable for printing and/or visual presentation from compressed image data.

2. Description of the Related Art

As is known, digital or digitized video data provides significant improvements over analog video media in many aspects. Digital video data can be readily compressed and decompressed, thereby enabling efficient transmission between remote sites. Efficient compression and decompression of digital video data also enhance performance in storage and retrieval of digital video data. Digital video data also allows better video image manipulation than analog video media.

With the advances in digital storage, Internet, and multimedia computing technologies, digital video can now be stored, accessed, and manipulated more easily. For example, a video program or a collection of video programs can be stored in an optical disc and be accessed by a computer system connected to an optical disc driver with the optical disc either stationed locally or remotely. The remotely located optical disc is accessed via a network. This arrangement allows creation of a video image database that can store a collection of video programs. Each video program can be retrieved from the image database for display and/or manipulation.

However, one of the challenging problems is managing and presenting image or video information. Segmenting a video program into a number of appropriate units (i.e., clips) and characterizing each clips with key frames has been suggested as one possible mechanism for organizing and representing video information. Using this prior art approach, the key frames of a video sequence are extracted from the video sequence to represent the content of the video sequence in abstract manner. Known prior art technologies can be used to extract key frames from a video sequence. However, none of the known frame extraction technologies determines if the extracted key frame is suitable for printing or visual presentation or not (e.g., blurred or not).

Moreover, it may also be desirable for a user to select or extract a particular image frame from a video program/sequence to be printed for sharing or display. The user may also want to select and print the frames that are representative of the video program. As is known, two types of image frames are typically suitable for printing or display. The first type of image frame is an individual still image frame. Still image frames are characterized as images without motion. If a still image is not blurred, the image is suitable for printing or display. The other type of image frame is a super-resolution image that can be extracted from a video sequence. For example, a super-resolution image can be extracted from a video sequence that has undergone some global camera motion. Unlike still images, the super-resolution images are composed from images that have undergone global motion. However, like still images, a less blurred super resolution image will also offer better printing quality.

The user typically does the frame selection while watching the video program. When the user feels that a desirable frame is shown, the user can stop playing the video program (i.e., pause) and then select the desired image frame for printing. The user may also go back a number of image frames to determine which one of the image frames backwards is best suited for printing.

Disadvantages are, however, associated with this prior arrangement of selecting image frames for printing or visual presentation. One disadvantage is that the selection typically requires the user to be in a constant alert state for relatively long period of time. This typically causes the user to be tired and loose focus quickly. Afterwards, it may be very hard for the user to look even at the display. However, the user may still be required to finish the selection of the image frames from the remaining video program or sequence relatively quickly.

Another disadvantage is that the image frames visually selected by the user may not necessarily be suitable for printing. This is due to the fact that it is often difficult for the user to determine visually how blurred the image frame is relatively quickly. This may also be due to the fact that it is often difficult for the user to determine how much motion information of the current image frame with respect to adjacent frames is contained in the image frame in a relatively short period of time. It will take the user prohibitively more time if the user views the video sequence frame by frame and repeatedly in order to select the image frames that are suitable for printing or visual presentation.

Thus, there exists a need to automatically identify and select image frames that are suitable for printing and/or visual presentation from a compressed video without user intervention.

SUMMARY OF THE INVENTION

One feature of the present invention is to allow automatic selection of image frames suitable for printing and/or visual presentation.

Another feature of the present invention is to automatically identify or select image frames suitable for printing and/or visual presentation from a compressed image data.

A further feature of the present invention is to automatically identify or select image frames suitable for printing and/or visual presentation from a compressed image data by automatically extracting and analyzing motion and human face information in the image frames.

A still further feature of the present invention is to automatically identify or select image frames suitable for printing and/or visual presentation from a compressed image data by detecting the degree of blur of the image frames directly using the information contained in the compressed image data.

An image processing system for automatically extracting image frames suitable for printing and/or visual presentation from a compressed image data is described. The image processing system includes a face detector that detects if an image frame contains at least a face. The image frame is regarded as suitable for printing and/or visual presentation if the image frame is determined to contain a face.

The image processing system also includes a blur detector that determines a blur indicator value of the image frame directly using the information contained in the compressed image data if the image frame is determined to contain a face. The blur detector indicates that the image frame is suitable for printing and/or visual presentation if the blur indicator value of the image frame is less than a predetermined threshold.

Moreover, an image processing system for automatically extracting image frames suitable for printing and/or visual presentation from a compressed image data is described. The system includes a motion analyzer that detects if an image frame contains motion with respect to its adjacent image frames. The image frame is regarded as suitable for printing and/or visual presentation if the motion analyzer determines that the image frame does not contain motion.

The image processing system also includes a blur detector that is coupled to the motion analyzer to determine the blur indicator value of the image frame if the image frame is determined not to contain motion. The blur detector indicates that the image frame is suitable for printing and/or visual presentation if the blur indicator value of the image frame is less than a predetermined threshold.

Furthermore, an image blur detector that detects if an image frame of a compressed image data is blurred is also described. The blur detector includes an extractor that extracts DCT (Discrete Cosine Transform) coefficients directly from the DCT compressed image. The blur detector also includes a detection module that computes a blur indicator value of the image frame by dividing energy of the high frequency DCT coefficients with that of all non-zero DCT coefficients of the image frame. This makes the blur indicator value of the image frame independent of the content of the image frame. If the blur indicator value is less than a predetermined threshold, the image frame is regarded as not blurred and suitable for printing and/or visual presentation.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 10 shows the weighting table used by each of the blur detectors of FIG. 2 to detect if an image is blurred or not.

DETAILED DESCRIPTION OF THE INVENTION

Figure 1:
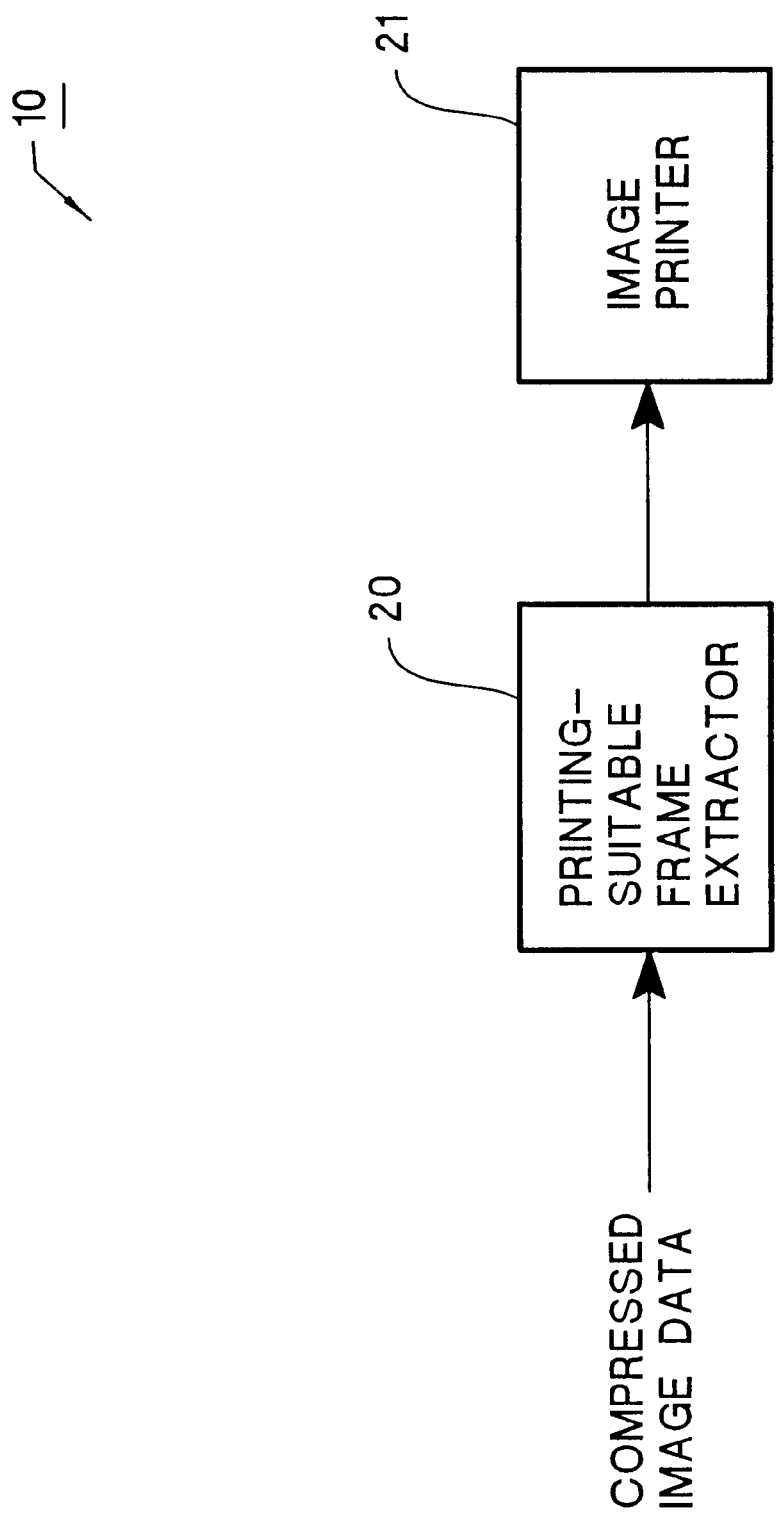
FIG. 1 shows an image printing system that includes a printing-suitable frame extractor in accordance with one embodiment of the present invention.
Figure 2:
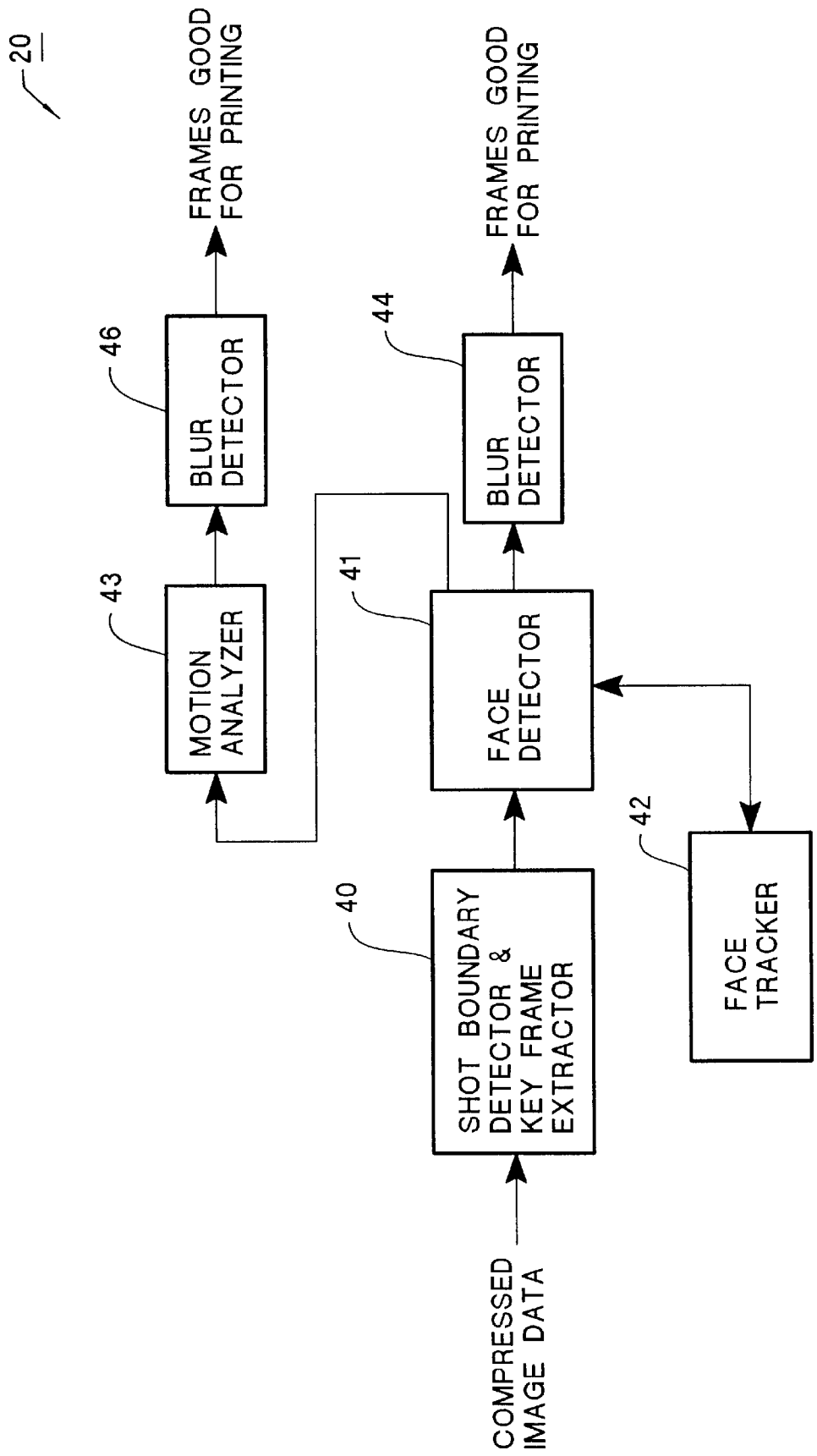
FIG. 2 shows the structure of the printing-suitable frame extractor of FIG. 1, wherein the frame extractor includes a face detector, a face tracker, a motion analyzer, and two blur detectors.

FIG. 1 shows an image printing system 10 that includes a printing-suitable frame extractor 20 that implements one embodiment of the present invention. FIG. 2 shows in block diagram form the functional structure of the printing-suitable frame extractor 20 in accordance with one embodiment of the present invention.

As will be described in more detail below, the frame extractor 20 automatically detects and extracts, from a compressed image data, image frames that are suitable for printing and/or visual presentation and without any user intervention. The image data can be a video image data or data of an image sequence. The frame extractor 20 determines the quality of an image frame for printing or visual presentation by determining the characterization of the image. The image characterization consists of motion analysis, face detection, and/or blur detection. As is known, images that contain faces are typically representative of the content of their respective shots, and thus are regarded as suitable for printing and/or visual presentation. In addition, images that do not contain motion with respect to their adjacent image frames in an image or video sequence are also considered as suitable for printing or visual presentation.

In accordance with one embodiment of the present invention, the frame extractor 20 employs a face detector (i.e., the face detector 41 shown in FIG. 2) that detects image frames suitable for printing and/or visual presentation by detecting if an image frame contains a face or not. The face detector 41 employs face detection and/or recognition technology to detect if an image frame contains a face. The face detector 41 also uses face-tracking information produced by a face tracker (i.e., the face tracker 42 of FIG. 2) in detecting if the current image frame contains a face or not. If a face is detected from the image frame, the image frame is regarded as suitable for printing and/or visual presentation. This image frame can then be subject to a blur detection to determine how blurred the image frame is.

In addition, the frame extractor 20 employs a motion analyzer (i.e., the motion analyzer 43 of FIG. 2) that detects if an image frame contains motion (i.e., contains motion information with respect to its adjacent image frames). If the image frame is detected not to contain any motion or motion information (i.e., if the image frame is an individual still image or an extracted super resolution image), the image frame may be selected as suitable for printing and/or visual presentation. To determine if an image frame contains motion, the motion analyzer 43 first determines all the macro-blocks in the image frame that contain reliable motion vectors. The motion analyzer 43 makes the determination of reliable motion vectors based on DCT (Discrete Cosine Transform) distribution of the macro-blocks (MBs). The motion analyzer 43 then estimates the motion perimeters of the image frame.

Moreover, the frame extractor 20 also includes a blur detector (i.e., the blur detector 44 or 46 in FIG. 2) that determines a blur indicator value of an image frame. The blur indicator value shows if the image frame is blurred or not. If the blur indicator value is less than a predetermined threshold value, the image is regarded as not blurred and is considered suitable for printing and/or visual presentation. The blur detector 44 or 46 determines the blur indicator value of an image frame by comparing energy of high frequency DCT coefficients of the image frame with that of all non-zero DCT coefficients of the image frame. This causes the blur indicator value of an image frame to be independent of the content and size of that image frame. The frame extractor 20 will be described in more detail below, also in conjunction with FIGS. 1 through 11.

Referring again to FIG. 1, the image printing system 10 includes an image printer 21 connected to the frame extractor 20. The image printer 21 can be any kind of known printer system. For example, the image printer 21 can be an ink-jet mono-color printer, a color ink-jet printer, or a laser monocolor or color printer. The image printer 21 can also be a scanner printer that includes both the scanning and printing functions. Alternatively, the image printer 21 can be other known imaging or image processing system, or image storage system. For example, the image printer 21 can be just a display. The image printer 21 may also simply be a device that receives images for printing, visual presentation or display, and/or further processing. This means that the image printing system 10 can be any kind of image printing or processing system.

As can be seen from FIG. 1, the frame extractor 20 receives the image data from an external source (not shown). The image data received in the frame extractor 20 include a sequence of image frames. The image data can be compressed, decompressed, or uncompressed image data. In one embodiment, the image data received by the frame extractor 20 is a MPEG (Moving Picture Experts Group) compressed image data. In other embodiments, the image data can be compressed according to other compression standard (e.g., JPEG (Joint Photographic Experts Group)).

The function of the frame extractor 20 is to detect and extract image frames suitable for printing and/or visual presentation from the image data. As described above, the frame extractor 21 extracts image frames that contain faces or image frames that do not contain motion as suitable image frames. In addition, the frame extractor 21 also determines the blur indicator value of image frames to determine if they are suitable for printing and/or visual presentation. The frame extractor 20 then sends the extracted image frames to the image printer 21.

The frame extractor 20 can be implemented by software, hardware, or firmware. In one embodiment, the frame extractor 20 is a software application program that is run on a computer system (not shown). The computer system that runs the frame extractor 20 can be a personal computer, a mini computer, a workstation computer, a notebook computer, a palm-top computer, a network computer, a server computer, a mainframe computer, or any other data processing system. Alternatively, hardware or firmware can implement some of the functions of the frame extractor 20 while others functions of the frame extractor 20 remain in software form. The functions and structure of the frame extractor 20 will be described in more detail below, also in conjunction with FIGS. 2 through 11.

FIG. 2 shows in more detail the structure of the frame extractor 20. As can be seen from FIG. 2, the frame extractor 20 includes a shot boundary detector and key frame extractor 40 in accordance with one embodiment of the present invention. In addition, the frame extractor 20 includes a face detector 41 connected to the shot boundary detector 40. A blur detector 44 is connected to the face detector 41. A face tracker 42 is also connected to the face detector 41. The face detector 41 is also connected to a motion analyzer 43. The motion analyzer 43 is then connected to a blur detector 46. The blur detectors 44 and 46 provide outputs of the frame extractor 20.

The shot boundary detector and key frame extractor 40 detects or identifies shot boundaries and key frames from the input video image data received in the frame extractor 20. As is known, a video program or an image sequence is comprised of consecutive camera shots. A shot in video parlance refers to a contiguous recording of one or more video frames depicting a continuous action in time and space. During a shot, the camera may remain fixed, or it may exhibit one of the characteristic motions—namely, panning, tilting, tracking, or zooming. The purpose of the shot boundary detector 40 is to determine the boundary between consecutive camera shots, and to identify key frames within a shot. The boundary data is then sent to the face detector 41, along with the image data.

Determining the shot boundaries and key frames has a number of practical applications. First, it allows the face detector 41 to only detect those image frames that are representative of the image sequence, thus reducing the time needed for detection. Secondly, the shot boundary information provides a convenient level for the study of the video or image program. Furthermore, the shot boundary data helps organizing and browsing the video/image program because the shot level organization of video/image documents is considered most appropriate for video/image browsing and content based retrieval.

In another embodiment, the shot boundary detector and key frame extractor 40 only includes a shot boundary detection function and does not include the key frame extraction function. Alternatively, the frame extractor 20 may function without the module 40.

The face detector 41 is connected to the shot boundary detector and key frame extractor 40. The face detector 41 receives the image data and the boundary information from the shot boundary detector 40. The face detector 41 is used to automatically detect or identify image frames that contain faces from the input image data. If an image frame is detected to contain a face, the image frame is regarded as suitable for printing and/or visual presentation.

In one embodiment, the input image data supplied to the frame extractor 20 is compressed according to the MPEG standard. In this case, the image data consists of a sequence of Group of Pictures (GOPs). When video data is compressed in accordance with other compression standard, the compressed video data can be processed to have similar structure as MPEG by grouping a number of frames into a group.

Each GOP contains a sequence of pictures (i.e., frames). A GOP can contain I, B, and P types of frames. An I-frame is a picture or frame that can be decompressed without any reference to any other types of frames. This means that I frames do not need motion compensation to decompress the image frames. A P frame is a picture or frame that can only be decompressed with reference to previous I or P pictures or frames. This means that usually P frames require motion compensation from a previous reference frame in order to code, compress, or decompress the frame. A B frame is a picture or frame that can only be decompressed with reference to previous or subsequent I and/or P pictures or frames. This means that a B frame is a bidirectional referenced frame and requires motion compensation from both directions.

Each frame includes a sequence of pixel blocks, each of which is referred to as a macro-block (MB). Each MB is, for example, sixteen by sixteen pixels in size. A mode is associated with each MB. The mode information determines how the macro-block is coded. There are several modes, such as a skipped mode, a forward-predicted mode, a backward-predicted mode, a bidirectionally-predicted mode, and an intra-mode.

In accordance with one embodiment of the present invention, the face detector 41 detects the face within an image. In addition, the face detector 41 also uses face tracking information fed from the face tracker 42 to help detecting a face in an image frame. When the input image data is compressed in accordance with the MPEG standard, the face detector 41 only detects whether an I image frame contains a face and skips the B and P image frames between I frames. The face tracker 42 helps or guides the face detector 41 in the face detection process by tracking the location of a face detected in a previous I frame through the subsequent B and P image. The face tracking information is then fed back to the face detector 41 to guide the face detector 41 to detect the face in a subsequent I frame. The face tracker 42 will be described in more detail below, also in connection with FIGS. 4 and 11.

Referring again to FIG. 2, if the face detector 41 does not detect any face in an image frame and if the previous image frame detected by the face detector 41 also does not include a face, the image frame can then be sent to the motion analyzer 43 to detect if the image frame contains motion. The motion analyzer 43 will also be described in more detail below, also in conjunction with FIGS. 8A–9.

The face detection of the face detector 41 is automatically done without any user intervention. The face detector 41 detects if an I image frame contains a face using a face detection technology, such as the neural network face detection technology or principle component analysis face or eye detection technology. In one embodiment, the face detection technology used by the face detector 41 for face detection is the neural network-based face detection technology. The neural network-based face detection technology is disclosed in a publication entitled HUMAN FACE DETECTION IN VISUAL SCENES, by H. Rowley (har@cs.cmu.edu), S. Baluja (baluja@cs.cmu.edu), and T. Kanade (tk@cs.cmu.edu) in November 1995. The publication is available from Carnegie Mellon University's Internet site at "www.ius.cs.cmu.edu/IUS/har2/har/www/CMU-CS-95-158R/." In another embodiment, the face detection technology used by the face detector 41 for face detection is the principle component analysis-based face detection technology. This principle component analysis-based face detection technology is disclosed in U.S. Pat. No. 5,164,992, dated Nov. 17, 1992, and entitled FACE RECOGNITION SYSTEM. Alternatively, the face detector 41 may use other known face detection technologies. Thus, the structure and operation of the face detector 41 will not be described in more detail below.

When the face detector 41 employs the neural network-based face detection technology, the face detector 41 detects if an image frame contains a face by dividing the image frame into a number of face candidate windows (not shown) and then detecting if each face candidate window contains a face by applying a set of neural network-based filters (also not shown) to each of the face candidate windows within the image frame. This is described in more detail in the above mentioned publication entitled HUMAN FACE DETECTION IN VISUAL SCENES. In this case, the face candidate windows can be non-overlapping or overlapping. The filters examine each face candidate window in the image at several scales, looking for locations that might contain a face (i.e., looking for eye locations). The face detector 41 then uses an arbitrator to combine the filter outputs. Using the neural network-based face detection technology, the face detector 41 makes the face detection robust, relatively fast, and detect most faces. In addition, it allows the face detector 41 to detect different kinds of faces with different poses and lighting.

Figure 3:
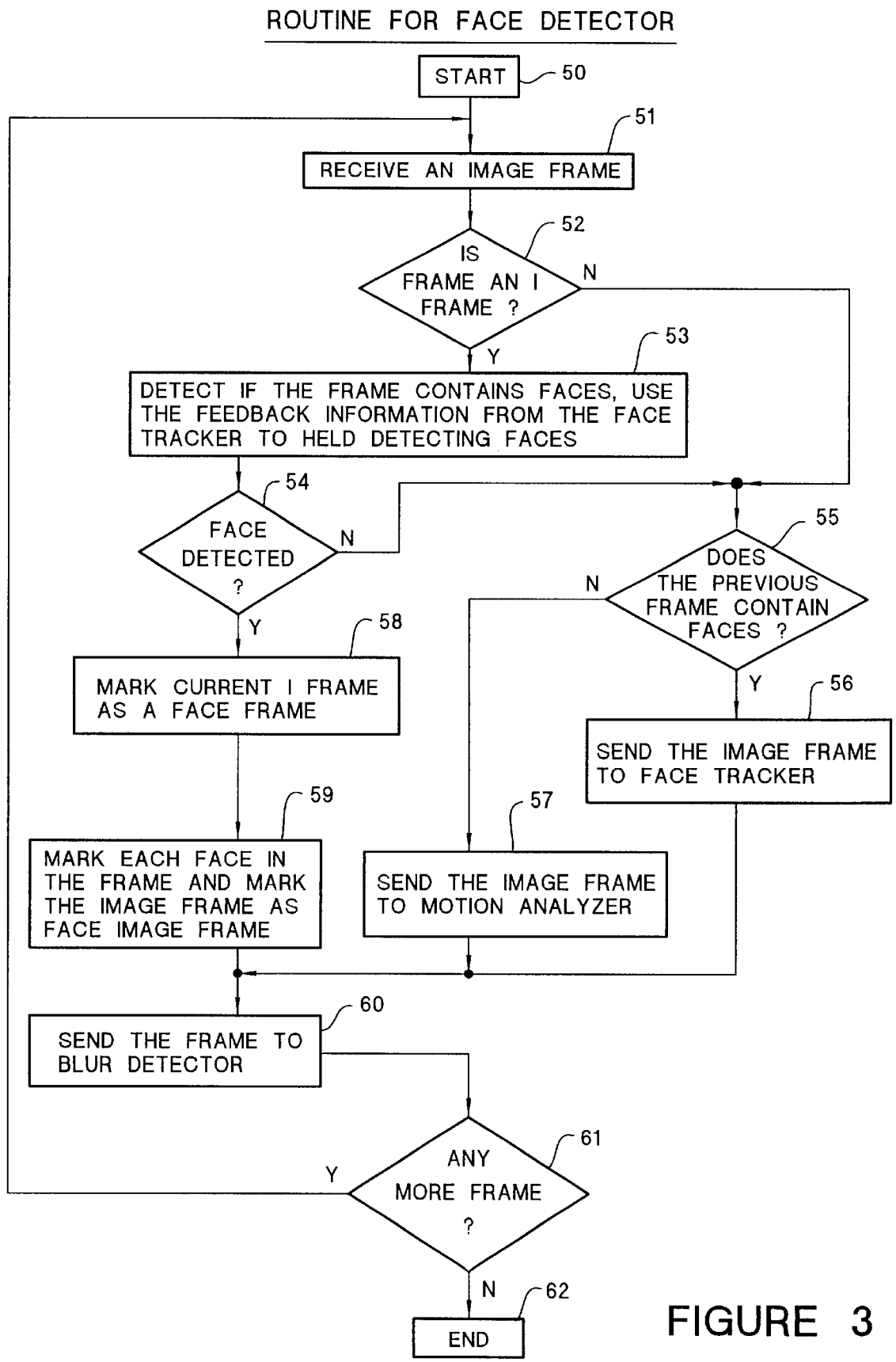
FIG. 3 is a flow chart diagram showing the process of the face detector of FIG. 2.

FIG. 3 shows the face detection process of face detector 41. As can be seen from FIG. 3, the process starts at the step 50. At the step 51, the face detector 41 receives an image frame. At step 52, the face detector 41 determines if the received image frame is an I frame. As described above, when the input image data is MPEG compressed image data, the face detector 41 only detects if an I image frame contains a face or not. If the received image frame is an I frame, the face detector 41 moves to the step 53. Otherwise, the face detector 41 moves to the step 55.

At step 53, the face detector 41 detects if the image frame contains a face using, for example, the above described face detection technologies. The face detector 41 also uses the face track information fed back from the face tracker 42 to help guide the face detection process. The process then moves to the step 54 at which the face detector 41 determines if a face has been detected from the image frame. If the answer is no, then the step 55 is the next step.

At the step 55, the face detector 41 determines if the previous I frame contains at least a face. If the answer is yes, the step 56 is performed. If the answer is no, then the step 57 is performed. At the step 56, the image frame is sent to the face tracker 42 (FIG. 2) to see if a face can be tracked by the face tracker 42. Face tracking is the ability to follow the location of any initially detected faces along the time axis. As will be described in more detail below, the face tracker 42 can track the location of a face in a previous image frame (e.g., a previous I frame) to detect non-frontal face in the subsequent image frames (i.e., the subsequent B and P frames). The face tracker 42 can also determine the appearance or disappearance of a face.

If, at the step 54 of FIG. 3, it is determined that the current image frame (i.e., I frame) contains a face, then the step 58 is performed. At the step 58, the current image frame is marked as a face frame. At the step 59, the face detector 41 marks each face in the face frame and makes sure the image frame is marked as face image frame. At the step 60, the face image frame is sent to the blur detector 44 to detect if the image is blurred or not.

The process then moves to the step 61. At the step 61, it is determined if there are more image frames for face detection. If so, the process returns to the step 51. If not, the process ends at the step 62.

Figure 4:
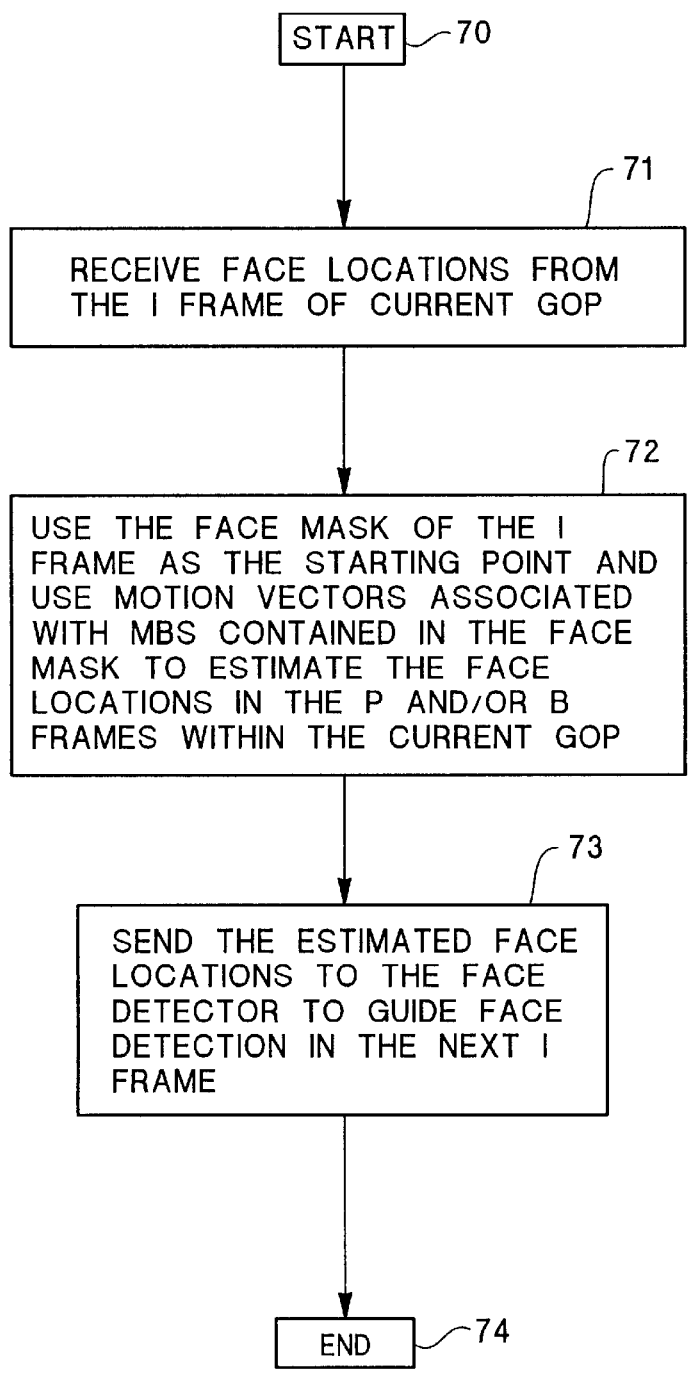
FIG. 4 shows a flow chart diagram of the face tracker of FIG. 2.

FIG. 4 shows the face tracking process of the face tracker 42 of FIG. 2. As described above, the face tracker 42 starts to function when the face detector 41 detects a face in the previous I image frame (i.e., the face detector 41 has detected that the prior I image frame contains a face). The face tracker 42 is used to see that if the face in the prior I frame can be tracked to the current I frame. The face tracker 42 is particularly useful in detecting non-frontal faces in the image frame that the face detector 41 typically does not detect. Face tracking is the ability to follow the location of any initially detected faces along the time axis. The face tracker 42 can return a bounding rectangle specifying the location of the face as well as a more precise mask describing the pixels belonging to the face. Starting from a face location on a given I frame, the face tracker 42 is able to provide to the face detector 41 the face location on the next (i.e., forward tracking) or the previous (i.e., backward tracking) I frame (see FIG. 11). The basic steps of the face tracking process of the face tracker 42 in the forward direction are (1) displacing the initial mask from P frame to P frame, starting from the initial mask located on the previous I frame that is detected to contain a face by the face detector 41, and (2) exploiting the motion information of the B frames to displace the mask from the last P frame of the GOP onto the next I frame (see FIG. 11). This means that the motion vectors associated with the MBs contained in the facemask are used to estimate or track the face location in the P and/or B frames until the current I. Then the predicted face location by the face tracker 42 will be used by the face detector 41 to guide its face detection. In this case, even if the face detector 41 fails to detect any face in the current I frame, the face tracking information from the face tracker 42 may still cause the face detector 41 to regard the current I frame as a face image frame.

Since a P frame is forward-predicted from a previous I or P frame, there will be no motion vector associated between the last P frame in a GOP and the next I frame in the next GOP. In this case, the tracking of a face is performed by deriving a motion vector from the last P frame in the GOP to the I frame of the next GOP using motion vectors associated with the B frames between the above mention P and I frames (see FIG. 11). In the backward tracking direction, B frames are used to obtain a prediction on the previous P frame (which is immediate before the current I frame). The mask is propagated from P frame to P frame (see FIG. 11).

If the face tracker 42 determines the tracked face has disappeared before the current I frame, this information is also fed to the face detector 41 so that the face detector 41 can ignore the tracked region. This is done by examining whether the location of the predicted face by the face tracker 42 is out of the boundary of the image frame. If the location of the predicted face is out of the boundary, the face is considered disappeared and the image frame is marked as the end frame for the face. If, in a backward tracking, the face tracker 42 determines that the tracked face started before the current I frame, the information will be recorded as an index of the face starting point in the sequence. The use of the face tracker 42 helps speed up the face detection process. It also allows detection of the starting point of face appearance or disappearance in a video sequence. In addition, the face tracker 42 detects face frames in which the faces detected may not be frontal faces.

As can be seen from FIG. 4, the face tracking process starts at the step 70. Initially at the step 71, the face tracker 42 receives the face location (i.e., facemask) from the previous I frame of the current GOP. Here, we assume that only one face is detected in the previous I frame. The process remains the same if the I frame contains two or more faces, except that the process is repeated for each additional face. At the step 72, the face tracker 42 uses the facemask in the previous I frame as the starting point. The face tracker 42 also uses motion vectors associated with the MBs contained in the facemask to estimate or track the face locations in the subsequent P and/or B frames within the GOP. When the tracking is done through P frames, the facemask is first motion-compensated, which could be followed by a filtering process using a morphological open-close filter with reconstruction. Then all pixels belonging to the new bounding box and being part of an intra MB whose mean chrominance is close enough to the one of the original mask are added to the mask. The original facemask should contain the face only in order to achieve the best performance. It is thus preferable to have a smaller initial mask.

As described above, since a P frame is forward-predicted from a previous I or P frame, there will be no motion vector associated between the last P frame in a GOP and the next I frame in the next GOP. In this case, the tracking of a face is performed by deriving a motion vector from the last P frame in the GOP to the I frame of the next GOP using motion vectors associated with the B frames between the above mention P and I frames (see FIG. 11). When the tracking is done through B frames, bi-directional predicted MBs are used to compensate the mask, while forward or backward only predictions are extended to compensate the mask with another level of certainty. Then the mask could be morphologically filtered and extended with the uncertain part if not as big as in the previous step. Finally, information from the intra MBs is also injected.

At the step 73, the estimated face locations are sent to the face detector 41 to guide the face detector 41 in detecting a face in the next I frame. If the face detector 41 detects a face in the predicted face area of the image frame, then the facemask in the face tracker 42 is reinitialized by the detected location of the face. The face tracking then continues to the next GOP. If the face detector 41 does not detect the face at the predicted face area, the face tracking of the face tracker 42 continues without new input from the face detector 41. The process then ends at the step 74.

Referring back to FIG. 2, if the face detector 41 detects that an I image frame contain a face (or is regarded to contain a face), that image frame is regarded suitable for printing and/or visual presentation. This image frame can also be referred to as a face image frame. As described above, a face frame is typically representative of the content of a sequence or group of images. In one embodiment, the face image frame can be directly sent for printing and/or visual presentation or display. In another embodiment, the face image frame from the face detector 41 is then sent to a blur detector 44.

The function of the blur detector 44 is to determine if the image frame is blurred or not directly using the DCT coefficient information in the compressed image frame. If the image is determined blurred, then the image is not considered suitable for printing, or as key frames for visual presentation. If the image is not blurred, then the image can be selected as suitable frames for printing or display. The blur detector 44 determines the blur measure of an image based on the distribution of DCT coefficients of the image. The blur detector 44 compares (e.g., divides) the high frequency DCT coefficients of each block of the image with the overall non-zero DCT coefficients to determine if the image is blurred or not. The use of DCT information of the entire image frame for blur detection allows the blur detector 44 to determine the global (camera or motion) blur (i.e., the general edge sharpness). In addition, in order to be independent of the content of the image, the blur detector 44 does not use the coefficients directly since their values are closely related to the type of image they depict. Instead, the blur detector 44 examines the energy or distribution of the coefficients because blurred image are likely to have more zero high frequency coefficients, regardless of their contents.

The blur detector 44 obtains a blur indicator value from the distribution of the high frequency DCT coefficients of the image with comparison to the overall non-zero DCT coefficients. The blur detector 44 then compares the blur indicator value with a predetermined threshold Tb. This threshold Tb can be set at user choice, while zero means the image is completely or totally not blurred at all and 100 means the image is completely blurred. In one embodiment, the threshold Tb is set at approximately 30%. Alternatively, other values may be used. For example, the threshold Th can be set at 40%.

Figure 5:
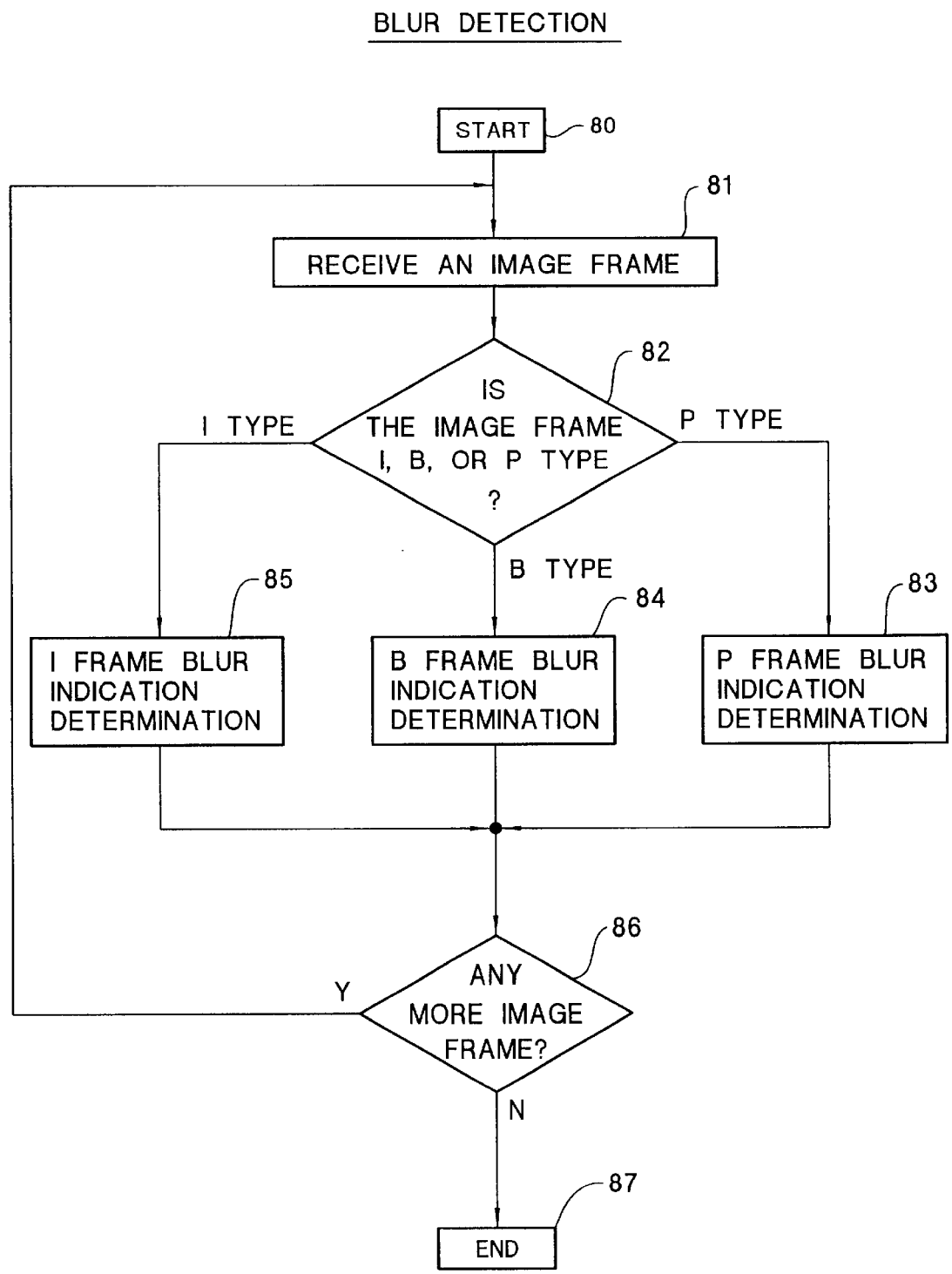
FIGS. 5 and 6 show in flow chart diagram form the process of blur detection for each of the blur detectors of FIG. 2.
Figure 6:
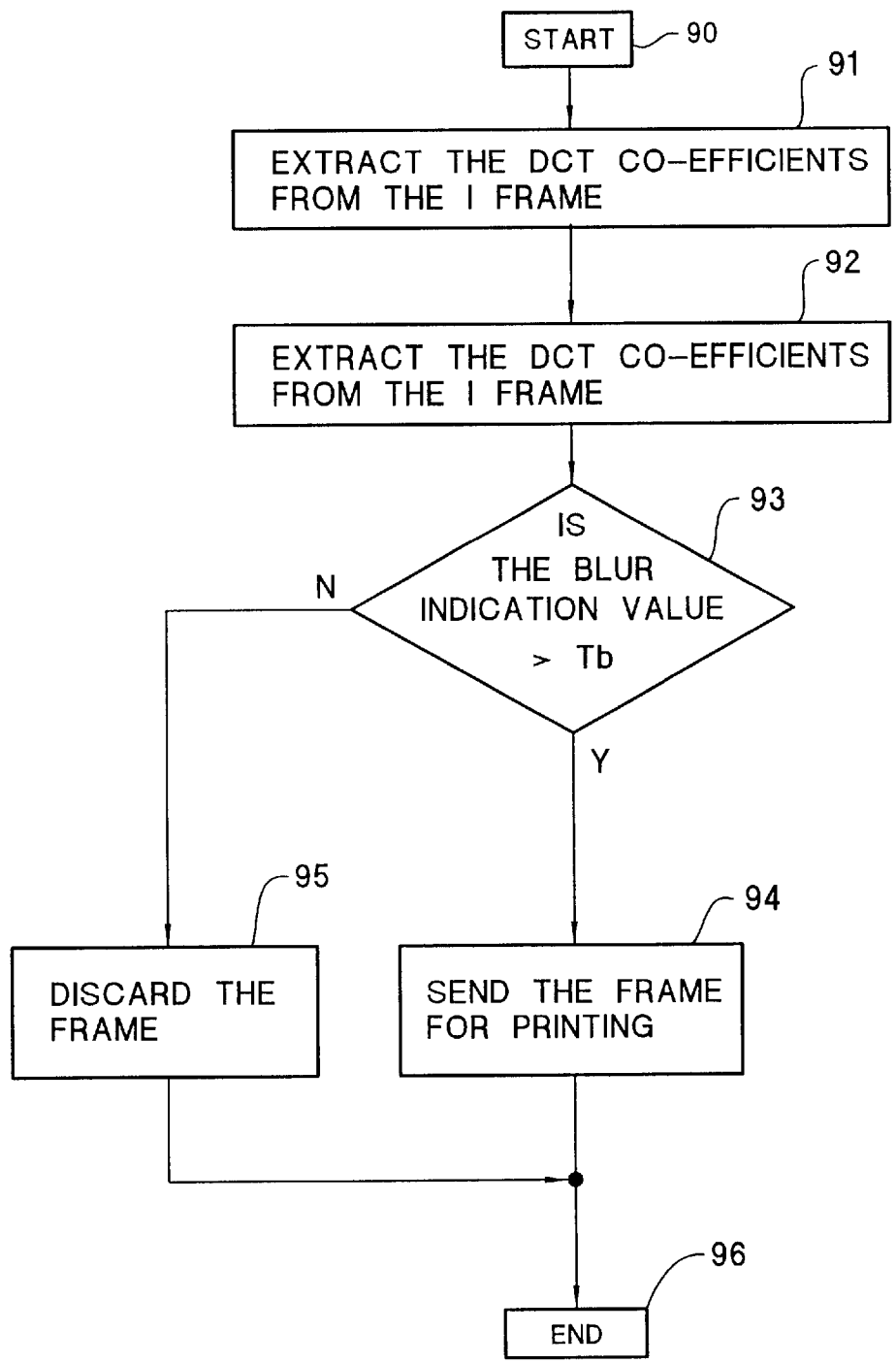
Figure 7:
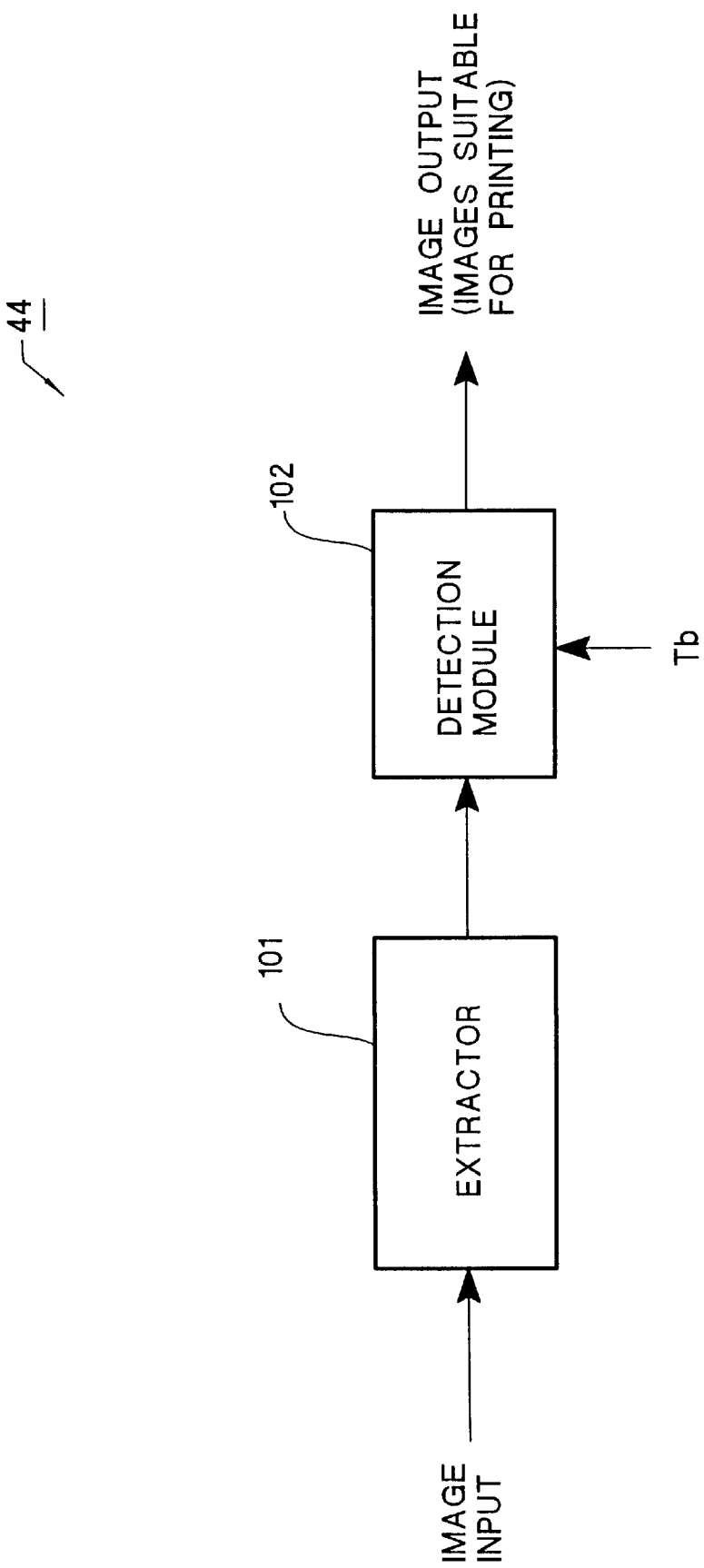
FIG. 7 shows the functional structure of each of the blur detectors of FIG. 2.

When calculating the occurrence histogram of non-zero DCT coefficients of the image frame, the number of times a DCT coefficient is not zero is divided by the number of blocks in the image frame in order to make the blur indicator value independent of the image size. Prior to this step, the number of non-zero occurrences of a non-DC (i.e., AC) DCT coefficient is divided by the number of non-zero occurrences of the DC DCT coefficient. These two steps will normalize the histogram cells to a maximum value of 1 for the frame. FIGS. 5 and 6 show the blur detection process for the blur detector 44 and FIG. 7 shows the functional structure of the blur detector 44. The blur detector 46 is identical both in terms of structure and function to the blur detector 44, and therefore will not be described in more detail below.

As can be seen from FIG. 7, the blur detector 44 includes an extractor 101 and a blur calculation module 102. The extractor 101 extracts the DCT coefficients of the image. This can be done using known means. The blur calculation module 102 determines the blur indicator value by calculating the occurrence histogram of non-zero DCT coefficients of all blocks in a frame.

FIG. 5 shows the blur detection process of the blur detector 44. As can be seen from FIG. 5, the process starts at the step 80. At the step 81, the image frame is received in the blur detector 44. At the step 82, the type of the image is determined. If the image is P type, then the step 83 is performed to perform the P type blur indication determination. If the image is B type, then the step 84 is performed to perform the B type blur indication determination. If the image is I type, then the step 85 is performed to perform the I type blur indication determination. FIG. 6 shows the process of the I frame blur indication determination, which will be described in more detail below. The P and B type blur indication determination is similar to the I type blur indication determination, and thus will not be described in more detail below.

Referring back to FIG. 5, the step 86 is then performed to determine if the blur detector 44 receives more image frames. If so, the process returns to the step 81. Otherwise, the process ends at the step 87.

In FIG. 6, the process starts at the step 90. At the step 91, the DCT coefficients are extracted from the I image frame. If the process is for B or P type image, this step is substantially the same. Then the process moves to the step 92, at which the blur indicator value is calculated. The process is substantially the same for the B and P type image.

At the step 92, the blur indicator value is calculated in accordance with following sub-steps. First, the DCT coefficients of the image are extracted or transformed from the image (e.g., a 256×256 image can be transformed into 1024 8×8 DCT matrixes). Then, a histogram of occurrence of non-zero DCT coefficients containing 64 registers, one for each of the DCT coefficients, is constructed. The histogram is initialized with all its values set to zero. Every DCT block of the image is then examined. Every time a DCT coefficient value is higher than a predetermined threshold Min, the corresponding histogram register is incremented. In one embodiment, the threshold Min is set at 10.

Then normalization of the histogram is performed at which all the values of the histogram are divided by the value of the DC DCT coefficient. Then all histogram values that are lower than a predetermined threshold value MaxHistValue are set to zero. In one embodiment, the threshold MaxHistValue is approximately 0.1.

Finally, the blur indicator value is computed using a predetermined weighting table, one of such is shown in FIG. 10 as weighting table 200. As can be seen from FIG. 10, the weighting table 200 is organized like a DCT table with the top-left corner being the weight of the DC coefficient and the bottom-right corner being the weight of the highest frequency AC coefficient. This weighting table 200 is designed to give a higher weighting value to all diagonal DCT coefficients regardless of frequencies. Another weighting table can be designed such that higher weighting values are given to high frequency DCT coefficients as well as diagonal DCT coefficients. A blur value is first calculated by weighting each non-zero histogram value using the corresponding weight and then divided by the sum of all the weights (e.g., 344). The final blur indicator value of the image is then computed in percentage (i.e., 0% means totally not blurred while 100% means completely blurred). The above described blur detection process shown in FIG. 6 is further illustrated by the following pseudo code which implements one embodiment of the blur detection of the present invention.

```
/* Extern parameters */
MinDCTValue;/* Minimum DCT value to take into account, typically 8 */
MaxHistValue;/* Histogram relative frequency to reach, typically 0.1 */
/* Constants for measure weighting */
Weight[64] =
{8,7,6,5,4,3,2,1,7,8,7,6,5,4,3,2,6,7,8,7,6,5,4,3,5,6,7,8,7,8,7,6,5,4,4,5,6,7,
8,7,6,5,3,4,5,6,7,8,7,6,2,3,4,5,6,7,8,7,1,2,3,4,5,6,7,8};
TotalWeight = 344;
/* Variables for computation */
DCTnon-zeroHist[64]; /* to compute the histogram */
blur;           /* to compute the blur measure */
/*Initialization of Histogram to zero */
for (k = 0; k < 64; k++)
    DCTnon-zeroHist[k] = 0;
/* Compute Histogram */
far (all macroblocks)
    {
    for (every luminance block)
        {
        for (every DCT component k) /* 0 <= k < 64 */
            {
            /* Add to histogram if coefficient is big enough */
            if (blockDCT[k] > MinDCTValue)
                DCTnon-zeroHist[k]++;
            }
        }
    }
/* Estimate blur via weighting matrix */
blur = 0;
for (every DCT component k) /* 0 < k < 64 */
    /* add the corresponding weight for all coefficients with a
    sufficient number of occurences */
    if (DCTnon-zeroHist[k] < MaxHistValue*DCTnon-zeroHist[0])
        blur += Weight[k];
/* divide by the sum of all weights */
blur /= WeightTotal;
/* output blur = blur × 100 */
```

Referring to FIG. 2, if the face detector 41 does not detect any face in a current image and no face can be tracked to the previous image frame of the current image frame, then the current image is sent to the motion analyzer 43. The motion analyzer 43 detects if the image contains global (i.e., camera) motion or local motion in the image. If the image does not contain both the global and local motion, the image may be regarded as suitable for printing and/or visual presentation. At this point, the image can be subjected to other selection criteria (e.g., blur detection). If the image contains local motion, then the image may not be considered suitable for printing or still display and subject to other selection criteria. If the image is determined to be in a sequence of global motion frames, the image is regarded as suitable for constructing a mosaic composition and/or resolution enhanced image.

Figure 9:
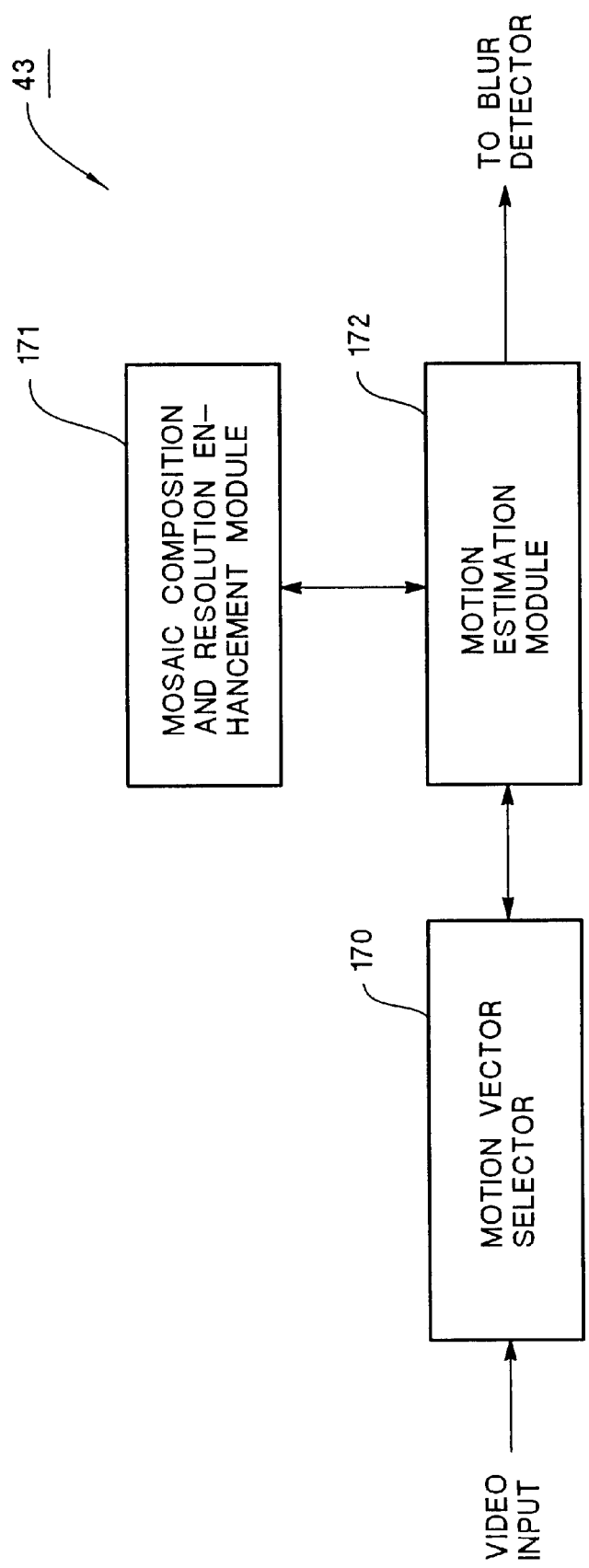
FIG. 9 shows the functional structure of the motion analyzer of FIG. 2.
Figure 11:
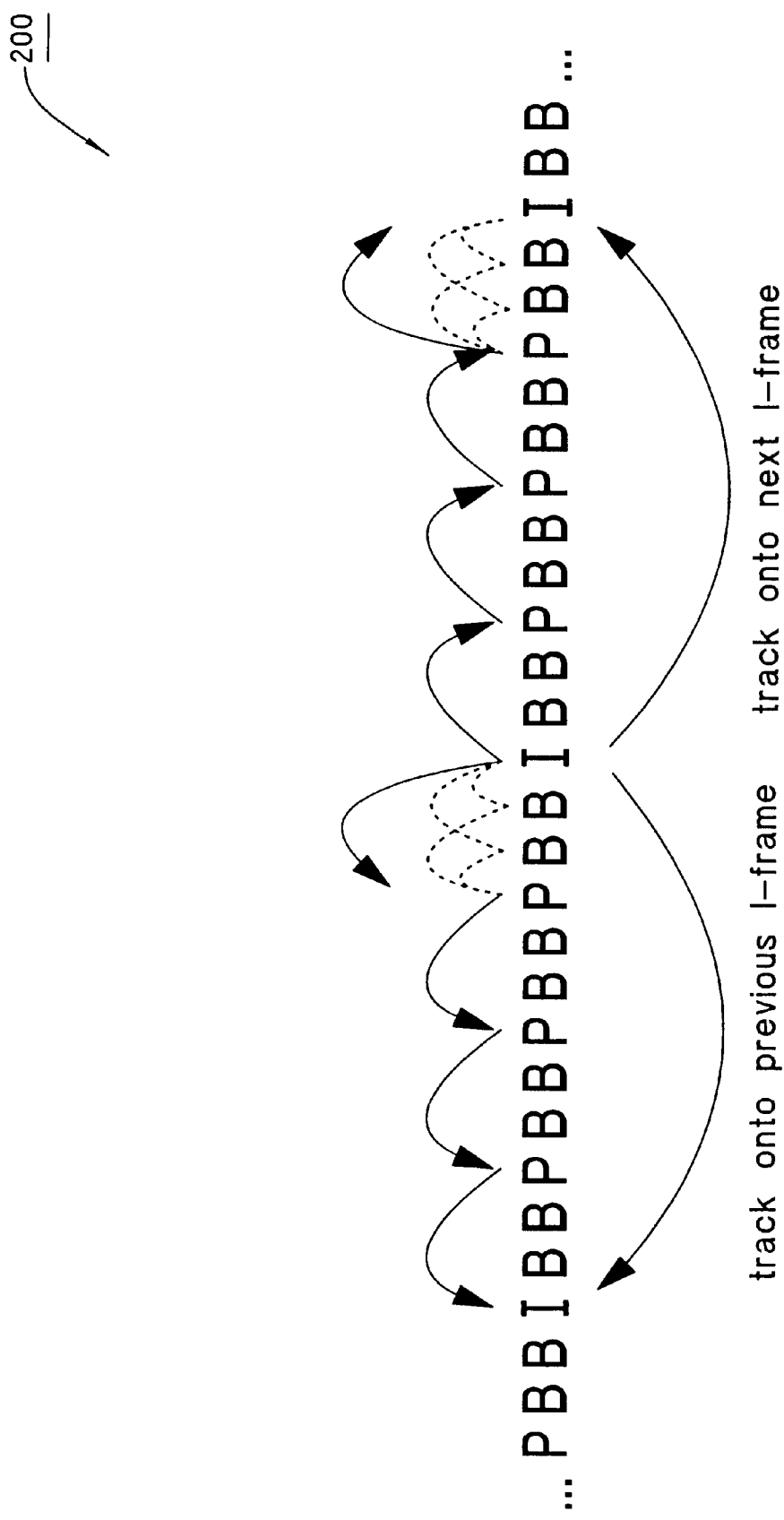
FIG. 11 shows various steps of the face tracking technique through P and B frames.

FIG. 9 shows the functional structure of the motion analyzer 43. As can be seen from FIG. 9, the motion analyzer 43 includes a motion vector selector 170. The motion vector selector 170 selects MBs in an image that contain reliable motion vectors. These MBs are referred to as reliable MBs.

The motion vector selector 170 determines that a MB is a reliable MB based on the DCT distribution of the MB. Two factors affect the determination by the motion vector selector 170. First, the MB must have been motion predicted and must not be an intra MB. Secondly, the MB needs to have a residual DCT whose DC value is lower than the threshold (e.g., 8)(i.e., not more than one pixel intensity). The motion vector selector 170 determines that a MB is reliable (i.e., contains a reliable motion vector) only when a small number of the non-zero DCT coefficients are high frequency DCT coefficients. In one embodiment, if the number is greater than or equal to six, the MB is considered reliable. Otherwise, the MB is not considered reliable.

The motion analyzer 43 also includes a motion estimation module 172 and a mosaic composition and resolution enhancement module 171 connected to the motion estimation module 172. The motion estimation module 172 is also connected to the motion vector selector 170. The motion estimation module 172 is used to estimate or determine the motion of the image based on the motion vectors in the reliable MAs of the image. The mosaic composition and resolution enhancement module 171 is used to compose mosaic images and to enhance images. Both modules 171 and 172 can be implemented using known technologies.

Figure 8A:
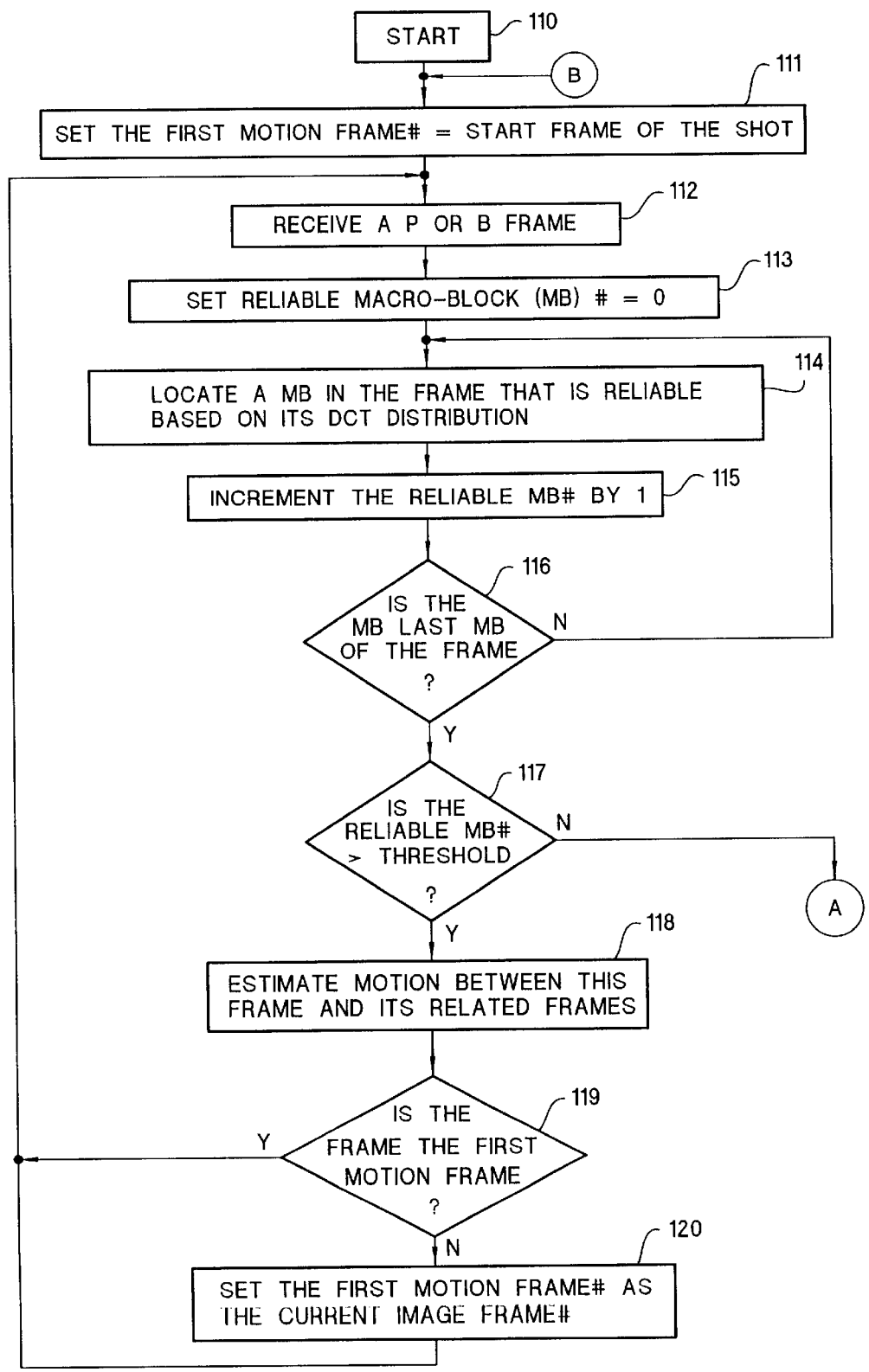
FIGS. 8A and 8B show in flow chart diagram form the process of the motion analyzer of FIG. 2.
Figure 8B:
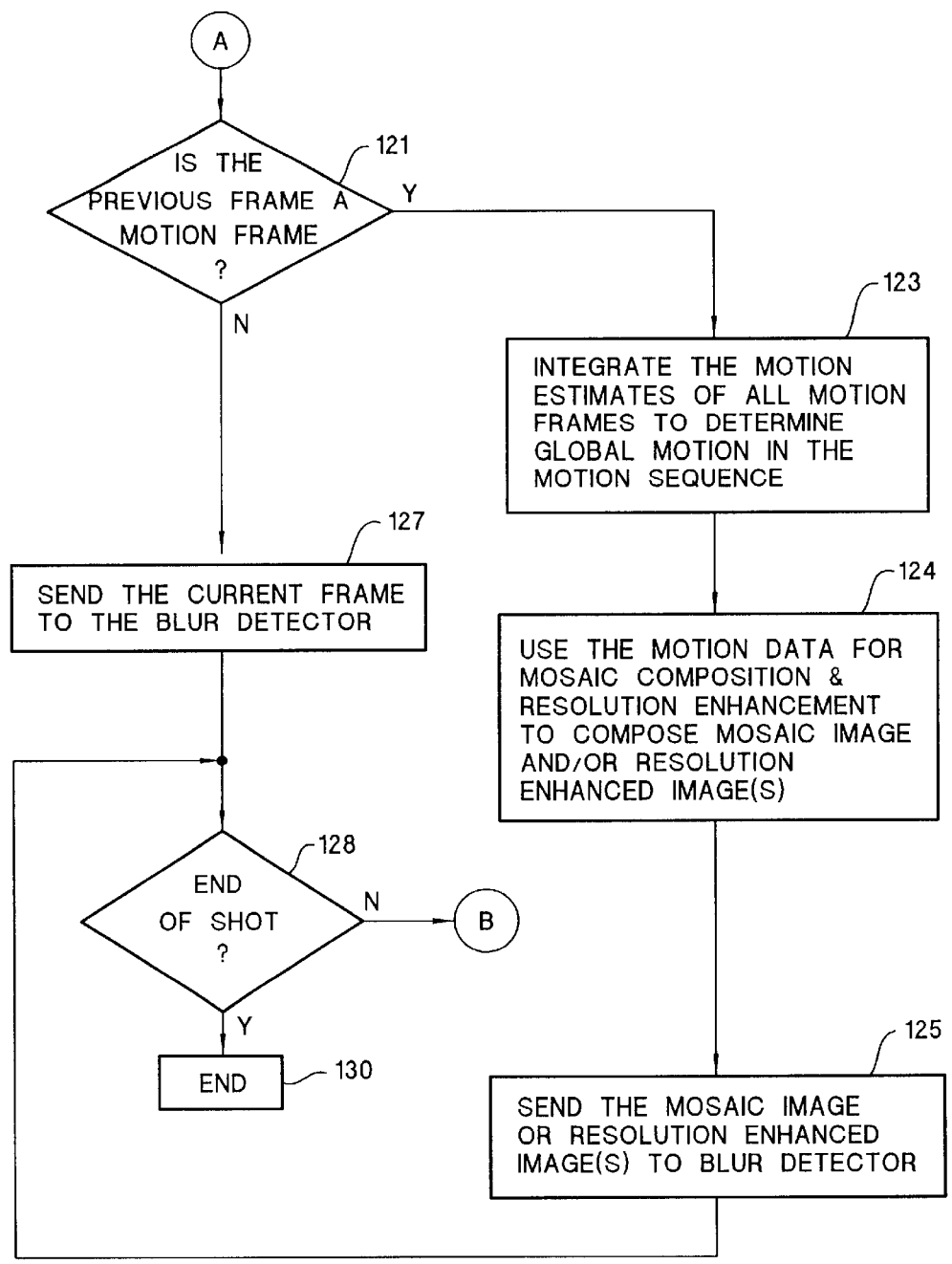

The motion estimation module 172 detects still frames (no motion at all) by computing the MBs that do not contain any motion. If the number is sufficiently high (e.g., 95% of the total MBs), the image is considered still. Otherwise, if a sufficient number of MBs within the image are reliable MBs (e.g., 90%), then the motion estimation module 172 determines the global or local motion of the image using known methods. FIGS. 8A–8B show the motion analysis process of the motion analyzer 43, which will be described in more detail below.

As can be seen from FIGS. 8A and 8B, the motion analysis process starts at the step 110. At the step 111, the first motion frame number is set to the start frame of the shot or GOP. At the step 112, a frame is received in the motion analyzer 43. In one embodiment, the motion analyzer 43 only examines P and B image frames. At the step 113, the reliable MB number counter to zero. At the step 114, the motion analyzer 43 locates a MB in the frame that is reliable based on the DCT distribution of the MB. The MBs that are considered reliable are the ones that contain reliable motion vectors. A MB is a reliable MB if it (1) has been motion predicted (i.e., not the intra MB), and (2) has a residual DCT whose DC value is lower than eight (i.e., not more than 1 in pixel intensity).

The reliable MB number counter is then incremented at the step 115. The step 116 is a determination step, at which it is determined if the MB is the last MB in the frame. If the MB is not the last one in the frame, then the step 114 is repeated. Otherwise, the step 117 is the next step, at which it is determined that if reliable motion number is greater than a predetermined threshold. In one embodiment, the predetermined threshold is set at six. Alternatively, the predetermined threshold can be greater or smaller than six.

If, at the step 117, the answer is no, then the process jumps to the step 121. If, at the step 117, the answer is yes, then the step 118 is performed, at which the motion analyzer 43 estimates the motion between the frame and its related frames. To determine pan and zoom motions, the following process is employed.

Once one MB is determined to be reliable, the following equations can be used to approximate local derivatives (i.e., if adjacent MBs are both reliable):

$\partial u_x \approx \Delta u_x = u(i,j) - u(i-1,j)$ $\partial u_y \approx \Delta u_y = u(i,j) - u(i,j-1)$ $\partial v_x \approx \Delta v_x = v(i,j) - v(i-1,j)$ $\partial v_y \approx \Delta v_y = v(i,j) - v(i,j-1)$ $\partial x \approx \Delta x = x(i,j) - x(i-1,j)$ $\partial y \approx \Delta y = y(i,j) - y(i,j-1)$ wherein (u,v) are the motion vector components of a MB and (Ij) indicate the location of the MB (i.e., ith number of jth row). In addition, when the size of a MB is 16, $\partial x = \Delta x = \partial y = \Delta y = 16$.

Then the zoom factor $\alpha$ and rotation $\theta$ are first computed. They are determined by some local derivatives according to:

$\alpha = \partial u / \partial x + 1 = \partial v / \partial y + 1$ $\theta = -1/\alpha \cdot \partial v / \partial x = 1/\alpha \cdot \partial u / \partial y$ These formulas are therefore computed for every available local derivative. The mean and variation are established and all values which are further to the mean than some multiple times (e.g., 1.5 times) of the variance are rejected. The final value of the zoom/rotation is equal to the mean of the selected values. Once the zoom and rotation are known, the panning $(t_x, t_y)$ can be determined in a similar way using the following equations:

$t_x = u - (\alpha - 1) \cdot x - \alpha \cdot \theta \cdot y$ $t_y = v + \alpha \cdot \theta \cdot x - (\alpha - 1) \cdot y$ wherein $\alpha$ is the zoom factor and $\theta$ is the rotation.

This implementation is straightforward for P type of frames and directly provides one with the global motion parameters between the current P frame the previous I or P frame. In this case, there is probably no need for examining the B frames since their motion information is redundant to that of the P frames. Nevertheless, in order to determine the motion that occurred between an I frame and the previous P frame, one has to look at the in-between B frames. In this case, two sets of global motion parameters are estimated, one for every reference frame (bi-directionally estimated MBs contribute to both sets). Then the parameters indicating the motion from the I frame to the B frame are reversed, and both sets are combined in order to obtain the motion between the I frame and the previous P frame. The final estimate consists of the average of the estimates provided by all B frames.

At the step 119, it is determined if the frame is the first motion frame. If so, the process returns to the step 112. If not, the step 120 is performed, at which the first motion frame number is set as the current frame number. The process then returns to the step 112.

At the step 121, the motion analyzer 43 determines if the previous frame is a motion frame. If so, this means that the current image frame the process moves to the step 123. If not, the process moves to the step 127. At the step 123, the motion analyzer 43 integrates the motion estimates of all motion frames to determine global motion in the motion sequence. The motion analyzer 43 then uses the motion data obtained for mosaic composition and resolution enhancement to compose mosaic image and/or resolution enhanced images at the step 124. At the step 125, the motion analyzer 43 send the mosaic image or resolution enhanced image for printing and/or visual presentation or to the blur detector 46 for blur detection. The process then moves to the step 128.

At the step 127, the motion analyzer 43 sends the current frame to the blur detector 46 for blur detection or sends the frame directly for printing or display. At the step 128, it is determined if the end of the shot or GOP is reached. If not, the process returns to the step 111 (FIG. 8A). If the answer is yes, then the process ends at the step 130.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An image processing system for automatically extracting image frames suitable for printing or visual presentation from a compressed image data, comprising:
   a face detector that detects if an image frame contains at least a face;
   a blur detector coupled to the face detector to determine the blur indicator value of the image frame, if the image frame is determined to contain a face, directly using the information contained in the compressed image data, wherein the blur detector indicates that the image frame is suitable for printing and/or visual presentation if the blur indicator value is less than a predetermined threshold, wherein the blur detector further comprises
      an extractor that extracts DCT (Discrete Cosine Transform) coefficients directly from the compressed image frame;
      a blur calculation module that computes the blur indicator value by examining the occurrence histogram of non-zero DCT coefficients of the image frame, wherein the blur indicator value is normalized by the size of the image such that the blur indicator value is independent of the content and size of the image frame.

2. The image processing system of claim 1, further comprising a face tracker coupled to the face detector to track the location of a detected face through subsequently skipped image frames by the face detector in order to guide the face detector to detect the face in a next image frame next to the skipped image frames in the face detector.

3. The image processing system of claim 2, wherein the face tracker also tracks the appearance or disappearance of a face using forward or backward tracking.

4. The image processing system of claim 2, wherein the compressed image data is compressed in accordance with MPEG standard and the face detector detects if an I image frame contains a face and skips all image frames between any two I frames.

5. The image processing system of claim 1, further comprising a motion analyzer coupled to the face detector to detect if the image frame contains motion when the face detector determines that the image frame does not contain any face, wherein the image frame is selected as suitable candidate frame for printing or visual presentation if the motion analyzer determines that the image frame does not contain motion.

6. The image processing system of claim 5, wherein the motion analyzer further comprises (I) a motion vector selector that selects macro-blocks from the image frame that contain reliable motion vectors;
   (II) a motion estimation module coupled to the motion vector selector to use the motion vectors of the selected macro-blocks to determine motion of the image frame with respect to related image frames.

7. The image processing system of claim 6, wherein the motion vector selector selects the macro-blocks from the image frame that contain reliable motion vectors by determining if a small number of DCT coefficients of the macro-block are non-zero DCT coefficients.

8. The image processing system of claim 5, further comprising a blur detector coupled to the motion analyzer to determine the blur indicator value of the image frame if the image frame is determined not to contain motion.

9. The image processing system of claim 1, further comprising a shot boundary detector and key frame extractor coupled to the face detector to provide shot boundary and key frame information to the face detector when the face detector detects face image frames from the compressed image data.

10. An image processing system for automatically extracting image frames suitable for printing or visual presentation from a compressed image data, comprising:
    a blur detector that determines the blur indicator value of the image frame if the image frame is determined not to contain motion, wherein the blur detector indicates that the image frame is suitable for printing and/or visual presentation if the blur indicator value is less than a predetermined threshold, wherein the blur detector further comprises
       an extractor that extracts DCT (Discrete Cosine Transform) coefficients directly from the compressed image frame;
       a blur calculation module that computes the blur indicator value by examining the occurrence histogram of non-zero DCT coefficients of the image frame, wherein the blur indicator value is normalized by the size of the image such that the blur indicator value is independent of the content and size of the image frame.

11. The image processing system of claim 10, wherein the compressed image data is compressed in accordance with MPEG or JPEG standard.

12. The image processing system of claim 10, wherein the blur calculation module computes the blur indicator value by
    calculating the occurrence histogram of non-zero DCT coefficients of the image frame;
    normalizing the occurrence histogram of non-zero DCT coefficients of the image frame by dividing (1) the histogram with the number of DCT blocks of the image frame, and (2) the number of non-zero occurrences of a non-DC DCT coefficient with the number of non-zero occurrences of the DC DCT coefficient;
    calculating the blur indicator value by summing the value of all cells of the occurrence histogram of non-zero DCT coefficients weighted by a predetermined DCT coefficient weighting table.

* * * * *